United States Patent [19]
Saxman

[11] Patent Number: 4,521,047
[45] Date of Patent: Jun. 4, 1985

[54] SUN VISOR ARRANGEMENT
[75] Inventor: Edwin F. Saxman, Allentown, Pa.
[73] Assignee: Mack Trucks, Inc., Allentown, Pa.
[21] Appl. No.: 477,658
[22] Filed: Mar. 22, 1983
[51] Int. Cl.³ .............................................. B60J 3/02
[52] U.S. Cl. ............................... 296/97 K; 296/97 R; 248/289.1
[58] Field of Search ............... 296/97 R, 97 H, 97 J, 296/97 K; 248/293, 289.1; 160/DIG. 3

[56] References Cited
U.S. PATENT DOCUMENTS 2,965,416 12/1960 Dryden .............................. 296/97 R
3,399,923 9/1968 Bornefeld et al. ............... 248/289.1
3,767,256 10/1973 Sarkees .............................. 296/97 K
3,825,296 7/1974 Peterson ............................ 296/97 D
4,369,996 1/1983 Fluck ................................. 296/97 K Primary Examiner—David A. Scherbel
Assistant Examiner—Russell D. Stormer
Attorney, Agent, or Firm—Bernard, Rothwell & Brown

[57] ABSTRACT

A sun visor arrangement is disclosed which includes three pivoted visors arranged along the windshield of a vehicle such as a truck. The left and right visors are movable from positions adjacent the windshield to positions adjacent the left and right doors, respectively, to provide shielding from sun glare as the vehicle moves along a curving road and its relation to the sun varies. The pivotal mounting of the outer visors are arranged so that when an outer visor is moved between its windshield and door positions it follows an arcuate path raising the visor above the occupant's head. In a left-hand-steer vehicle, the center visor is constructed at its left side to provide a stowage bracket for receiving a rod extension of the left visor for holding the free end of the left visor in position. This stowage bracket is formed so that should the center visor be pivoted towards its left-hand position before the left visor is moved from its windshield position, the bracket automatically releases itself from the rod extension of the left visor.

6 Claims, 8 Drawing Figures

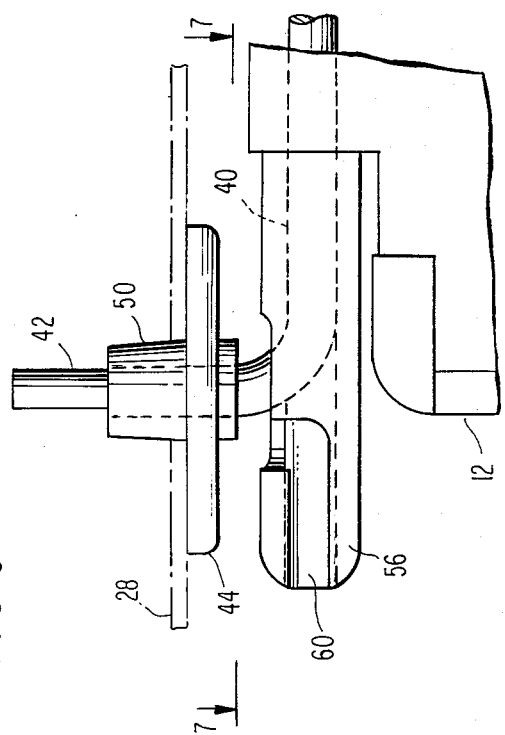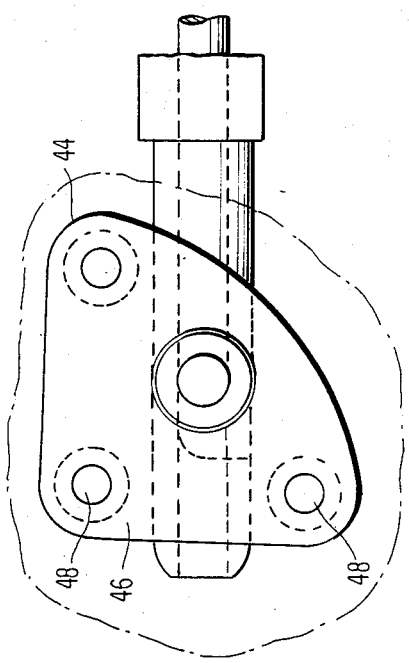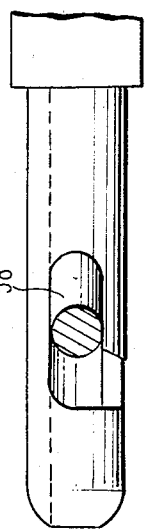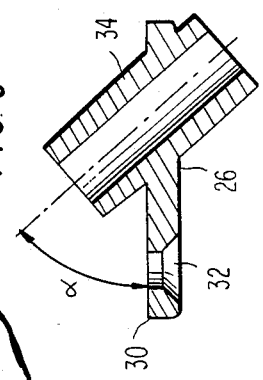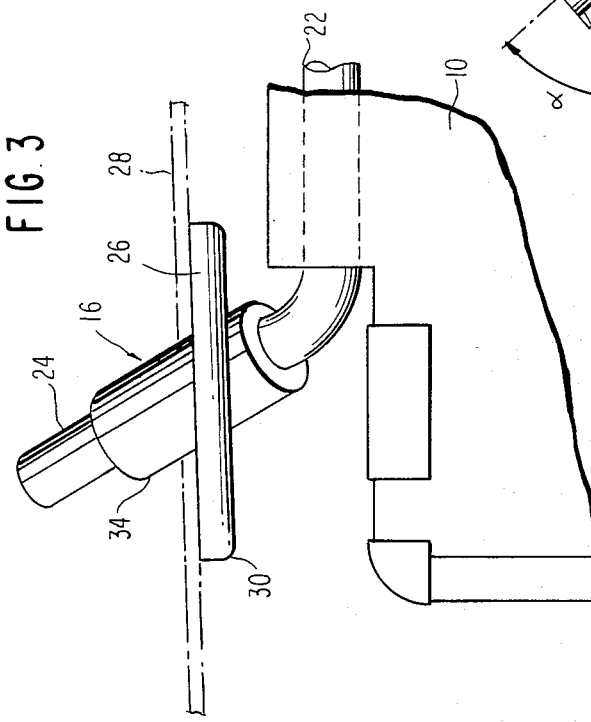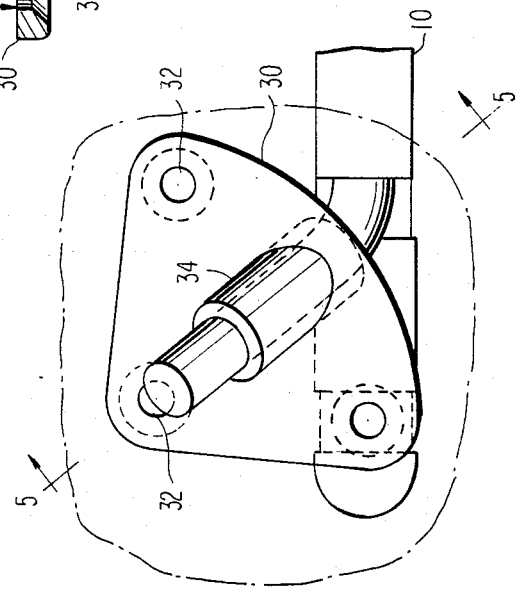

SUN VISOR ARRANGEMENT

BACKGROUND OF THE INVENTION

1. Field of the Invention

This invention relates to a sun visor arrangement for shielding vehicle occupants from sun glare, and more particularly, to a convenient arrangement in which the visors may be positioned either adjacent the windshield or adjacent the door to provide shielding from sun glare as the position of the vehicle relative to the sun varies.

2. Description of the Prior Art

The prior art has long provided sun visors which are movable from a windshield position to a side window or door position. Further, the prior art has disclosed arrangements in which such shifting between windshield and door positions has been provided for both the driver and the passenger side of the vehicle. The prior art has also included sun visor arrangements which include right, left and center visors extending across the full width of the windshield of the vehicle.

However, none of the prior art visor arrangements with which the applicant is familiar have provided the versatility and convenient arrangement of the sun visor structure of this invention.

Further, in prior art visor arrangements, it is usually necessary for the driver or other occupant to shift his head to the side or to duck to allow the visor to clear his head when moving between its windshield and side door positions. By the visor mounting arrangement of this invention, the visor path is such that it clears the occupant's head without requiring the occupant to change the position of his head.

It is an object of this invention to provide an improved sun visor arrangement including left, center and right visors in which, in cases where the steering wheel is on the left side, the left visor may be moved to a position adjacent the left door of the vehicle and the center visor may be moved into the position previously occupied by the left visor. In cases where the steering wheel is on the right side of the vehicle, the right visor would be moved to a position adjacent the right door and the center visor would then be moved into the position previously occupied by the right visor.

It is a further object of this invention to provide such a sun visor arrangement having a center visor construction which includes a stowage bracket conveniently serving as a receptacle for receiving the free end of the driver's visor to hold that visor in position when the three visors are in their normal windshield position.

It is a further object of this invention to provide such a stowage bracket construction on the center visor wherein the pin of the driver's visor received in the stowage bracket is automatically released therefrom when the center visor is moved towards its outer position.

It is a further object of this invention to provide a visor mounting arrangement whereby the visor follows a path which enables it to clear the head of the vehicle's occupant without requiring the occupant to change the position of his head.

SUMMARY OF THE INVENTION

In carrying out the invention, in one form thereof, as applied to a left-hand-steer vehicle, three pivoted visors are arranged along the windshield of a vehicle such as a truck. The left and right visors are movable from positions adjacent the windshield to positions adjacent the left and right doors, respectively, to provide shielding from sun glare as the vehicle moves along a curving road and its relation to the sun varies. The pivotal mounting of the left visor, that is, the visor on the driver's side of a left-hand-steer vehicle, is arranged so that when the left visor is moved between its windshield and door positions it follows an arcuate path raising the visor above the driver's head and eliminating the need to duck. The center visor, which in a left-hand-steer vehicle is movable between its center position and a position at the left end of the windshield, is constructed at its left side to provide a stowage bracket for receiving a rod extension of the left visor for holding the free end of the left visor in position. Further, this stowage bracket is formed so that should the center visor be pivoted towards its left-hand position before the left visor is moved from its windshield position, the bracket automatically releases itself from the rod extension of the left visor. In a right-hand-steer vehicle, the arrangement would be reversed so that the center visor is movable between its center position and a position at the right end of the windshield.

BRIEF DESCRIPTION OF THE DRAWINGS

For a better understanding of the invention, reference may be had to the accompanying drawings in which:

FIG. 3 is an enlarged elevation view of a portion of the left visor showing the pivotal mounting arrangement thereof;

FIG. 4 is a top view of the portion of the left visor and its mounting shown in FIG. 3;

FIG. 5 is a sectional view taken along the line 5—5 in FIG. 4;

FIG. 6 is an elevation view of a portion of the left-hand end of the center visor, showing its mounting arrangement;

FIG. 7 is a view taken along the line 7—7 in FIG. 6; and,

FIG. 8 is a top view of the portion of the center visor shown in FIG. 6.

DESCRIPTION OF THE PREFERRED EMBODIMENT

Figure 1:
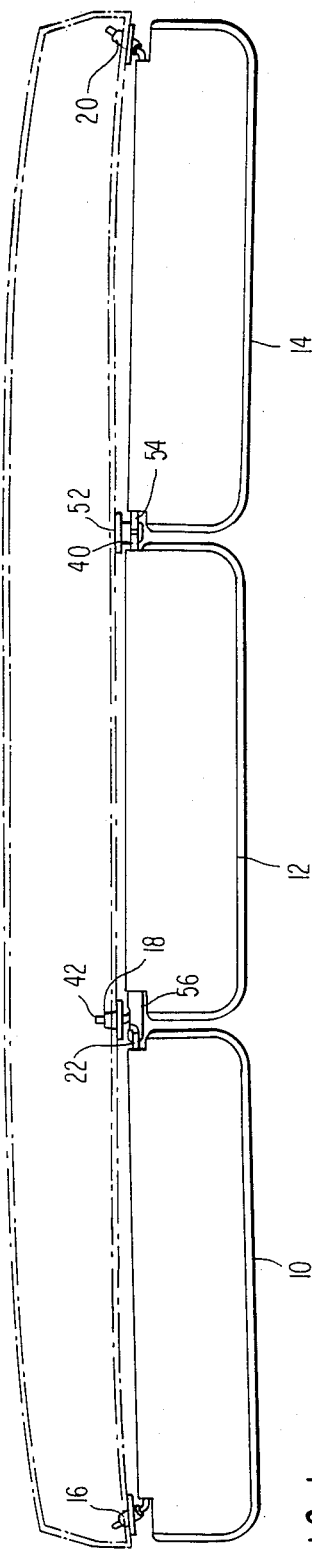
FIG. 1 is an elevation view showing the arrangement of the sun visors of this invention adjacent the windshield of a portion of a vehicle such as a truck cab.

Referring to FIG. 1, which illustrates the invention as applied to a left-hand-steer vehicle, there is shown a sun visor arrangement for a vehicle, for example, a truck cab. In the particular arrangement shown in FIG. 1, three sun visors 10, 12 and 14 are shown positioned along the width of the windshield of the vehicle. The visors are shown in their vertical, that is, sun-shielding position, but, in accordance with common practice, they are movable about horizontal axes to a horizontal position adjacent the roof of the vehicle. While in the form shown three sun visors are employed because, in the particular application shown where the visors are employed in a relatively wide truck cab, three such visors are desirable to cover the entire width of the windshield, it will become apparent as this description proceeds that in its essential aspects the invention is equally applicable to a more narrow vehicle in which only two sun visors are employed.

Figure 2:
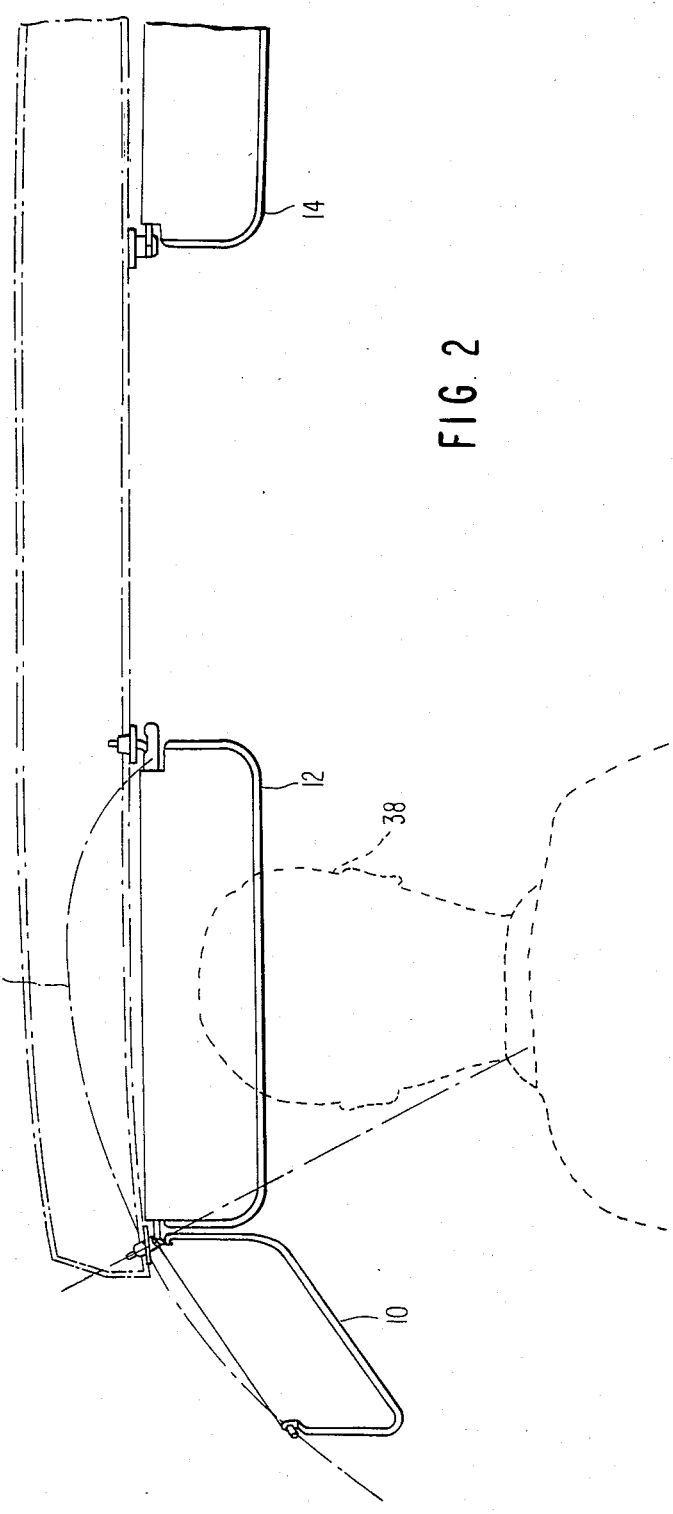
FIG. 2 is a view similar to FIG. 1, showing the left and center visors in their alternate positions.

The left-hand visor 10, that is, the visor at the driver's side of a left-hand-steer vehicle, is mounted at 16 for movement from the position shown in FIG. 1 adjacent the windshield to the position shown in FIG. 2 where the visor 10 is positioned adjacent the side of the vehicle, that is, adjacent the left door. The center visor 12 is mounted as shown at 18 for movement from the position shown in FIG. 1 where the visor is adjacent the center portion of the windshield to a second position shown in FIG. 2 wherein the center visor is at the left-hand side of the vehicle, that is, essentially in the position previously occupied by the left-hand visor 10. The right-hand visor 14 is mounted, as shown at 20, for movement from a first position adjacent the right-hand side of the windshield as shown in FIG. 1, to a second position adjacent the side of the vehicle, that is, adjacent the right door.

In FIGS. 3, 4 and 5, details of the mounting arrangement for the left-hand visor 10 are shown, the visor including a horizontally extending rod 22 about which the visor is movable between a vertical position adjacent the windshield and a horizontal position adjacent the top of the vehicle. The rod 22 includes at its left end an upwardly bent portion 24 which is formed, for reasons discussed below, to extend at an angle of approximately 45 degrees with the horizontal. For supporting the visor, a mounting bracket 26, adapted to be mounted on the roof 28 of the vehicle, is provided. The bracket includes a somewhat triangular-shaped plate 30. The plate 30 includes a plurality of holes 32 for receiving screws (not shown) to mount the bracket 26 on the frame of the vehicle. The bracket 26 further includes a tubular portion 34, formed integral with the plate 30, which extends at an angle α with respect to the plate 30. The angle α is approximately 45 degrees. In addition to the arrangement of the tubular portion 34 at an angle of approximately 45 degrees with the plate 30, the bracket 26 is formed and mounted so that the tubular portion 34 extends along a plane approximately mid-way between the plane of the windshield and the plane of the left door or side of the vehicle.

The visor 10 is movable about the axis provided by the above-described mounting arrangement between the position shown in FIG. 1 adjacent the windshield and the position shown in FIG. 2 where this visor is adjacent the side of the vehicle. Because of the construction of the mounting bracket 26 and its position on the roof of the vehicle, the visor 10 in moving between its first and second positions, that is, between its position adjacent the windshield and its position adjacent the side of the vehicle, is caused to move along an arcuate path generally indicated by the dashed line 36 in FIG. 2. The visor therefore reaches its highest point approximately mid-way in its travel between its two positions and thereby provides an elevated position of the visor which enables it to clear the head of the driver, indicated at 38, without requiring the driver to duck beneath the visor during such movement.

The mounting arrangement for the center visor is shown in more detail in FIGS. 6-8. As there shown, the center visor 12 includes a horizontally extending rod 40 about which the visor is movable from a vertical position adjacent the windshield to a horizontal storage position adjacent the roof of the vehicle. The rod 40 includes at its left end an upwardly extending generally vertical portion 42 about which the visor 12 pivots in moving from its first position adjacent the center of the windshield, as shown in FIG. 1, to its second position adjacent the left-hand side of the windshield, as shown in FIG. 2.

A mounting bracket 44 is provided for supporting the center visor 12 and providing for its pivotal movement. The mounting bracket includes a plate 46, similar to the plate 30. The plate 46, like the plate 30, includes a plurality of holes 48 for mounting the bracket 44 on the roof of the vehicle. To provide for pivotal movement of the visor 12, the mounting bracket 44 further includes a tubular member 50 formed integral with the plate 46. The tubular member 50 in its mounted position occupies a generally vertical position so that the portion 42 of the rod 40, which extends through the tubular member 50, also is supported in a generally vertical position. The visor 12 therefore moves about the vertical axis provided by the tubular member 50 and the vertical portion 42 between its center and left-hand positions.

The right-hand visor 14 is similar in construction and mounting to the left-hand visor 10, being essentially a mirror image thereof, and this visor and its mounting arrangement need therefore not be described in detail. A bracket 52, which is mounted on the roof of the vehicle, is provided at the adjacent ends of the visors 12 and 14 for supporting the free end of the rod 40 of the center visor 12 and the free end of the rod 54 of the right-hand visor 14.

A significant aspect of the invention is the arrangement for supporting the free end of the rod 22 of the left-hand visor 10. This arrangement is shown in FIG. 1 and in FIGS. 6-8. Referring particularly to FIGS. 6-8, the center visor 12 includes a member 56 positioned at the left-hand end of the rod 40 of the center visor. The member 56 includes an elongated opening 58 at the top portion thereof through which the vertical portion 42 of the rod 40 extends. The member 56 further includes, at the left-hand end thereof and on the portion thereof facing away from the windshield, an elongated recess 60. The recess 60 is made of such size that the right-hand end of the rod 22 of the left-hand visor 10 is received therein with a snap or friction fit so that when the left-hand and center visors 10 and 12, respectively, are in the position shown in FIG. 1, the right-hand end of the visor 10 is supported by the member 56. While the member 56 has been shown and described as being mounted on the left-hand end of rod 40, it will be apparent that the member 56 could be formed integral with the rod 40 if desired.

The location of the elongated recess 60 and its position relative to the visors is important to the successful movement of the visors between their several positions. Thus, as indicated above, the elongated recess 60 is formed in the member 56 so that when the visors are in their vertical position, in which the visors may be moved from the position shown in FIG. 1 to those shown in FIG. 2, the recess 60 faces away from the windshield, that is, towards the rear of the vehicle, and is located beyond the axis 42 about which the center visor 12 pivots. Should the driver or one of the occupants of the vehicle move the center visor 12 from its first position, as shown in FIG. 1, toward its second position, as shown in FIG. 2, before the left-hand visor 10 has been moved from its first to its second position, that is, when the end of the rod 22 is still within the recess 60, the end of the rod 22 will be automatically released from engagement with the recess 60 of the member 56 as soon as the initial turning movement of the center visor 12 toward its second position is begun. Thus, the member 56 provides a convenient and effective means for supporting the free end of the visor 10, but at the same time insures that immediate release of the rod of this visor as soon as movement of the center visor 12 begins.

It can be seen from the above description that the sun visor arrangement of this invention provides substantial versatility in meeting varying road conditions and further provides a convenient mounting arrangement and an easy shifting of the visors from one position to another. Thus, when the vehicle is travelling along a curving road where the position of the vehicle relative to the sun may repeatedly change so that the sun is at one time in line with the windshield of the vehicle and at other times in line with one side or the other of the vehicle, the driver or passenger of the vehicle may quickly and easily and conveniently shift the appropriate visor or visors to provide a shield from the sun. Moreover, the driver, on a curving road, may move both the left-hand visor 10 and the center visor 12 to their second positions, shown in FIG. 2, so that as the vehicle changes course and, as a result, the rays of the sun shift between the windshield and the side of the vehicle, the driver is continuously shielded from the sun's glare. On a relatively straight road, where the sun's position may be steadily in line with the windshield, the visors may be placed in the positions shown in FIG. 1 so that both the driver and the passenger are fully shielded from the sun's glare. When the left-hand visor 10 is moved between its first and second position, its mounting arrangement, as described above, is such that it moves along an arcuate path causing the visor to move to a somewhat elevated position mid-way in its travel and thereby to clear the head of the driver. The right-hand visor 14 is similarly mounted so as to clear the head of the passenger. Further, as described above, the support for the free end of the left-hand visor 10, provided by the member 56, is so arranged that should the center visor 12 be moved towards its second position before the movement of the left-hand visor has begun, the end of the rod 22 of the left-hand visor is automatically released from its engagement with the member 56.

While a particular embodiment of this invention has been described in detail as applied to a left-hand-steer vehicle, it is apparent that the invention is equally applicable to right-hand-steer vehicles. In the latter application, of course, the relationship of the visors would be reversed so that, for example, the member 56 on the center visor would be arranged to receive the end of a rod on the right-hand visor. In the specification and claims, the terms "left" and "right" are used for convenience and clarity, but it is intended that the claims apply equally to left-hand-steer and right-hand-steer vehicles.

Further, while the invention provides its maximum benefits as applied to vehicles of such width that the three-visor arrangement is utilized, it is also applicable to arrangements in which only two visors are employed.

While a particular embodiment of the applicant's invention has been shown and described, the specific construction may be modified without departing from the scope of the invention, and it is intended by the appended claims to cover all such modifications as come within the spirit and scope of this invention.

It is claimed:

1. A sun visor arrangement for a vehicle having a windshield and left and right doors adjacent the ends of the windshield comprising:
   (a) a first visor at one side of the windshield and a second visor positioned adjacent said first visor;
   (b) said first visor being arranged for pivotal movement between a first position adjacent the windshield and a second position adjacent one of said doors;
   (c) said second visor being arranged for movement about a pivotal axis between a first position adjacent the windshield and to one side of said first visor and a second position substantially in the first position of said first visor;
   (d) said first visor including a first rod extending from the free end thereof;
   (e) said second visor including a second rod having a portion extending beyond the pivot axis of said second visor on the side of the pivot axis opposite the free end of said second visor for receiving said first rod to support the free end of said first visor; and
   (f) said member including a recess for frictionally receiving said first rod, said recess being open on the side facing away from said windshield, whereby when said second visor is moved from its first position towards its second position, said first rod is automatically released from said recess.

2. The sun visor arrangement as recited in claim 1, wherein:
   (a) said second visor includes a horizontally extending rod about which said second visor is movable between a horizontal position and a vertical position; and
   (b) said member is disposed on one end of said rod.

3. The sun visor arrangement as recited in claim 2, wherein:
   (a) said horizontally extending rod of said second visor includes a vertically extending portion at said one end thereof; and
   (b) means for mounting said vertically extending portion to provide a pivotal axis for moving said second visor between its first and second positions;
   (c) said member including an opening in the top portion thereof and said vertically extending portion extending through said opening;
   (d) said member including a section extending beyond said vertically extending portion; and
   (e) said recess being formed in said section.

4. The sun visor arrangement as recited in claim 1, wherein:
   (a) said first visor includes a pivot member extending at an angle of approximately 45° with the horizontal and extending along a plane approximately midway between the plane of the windshield and the plane of the door, whereby during movement of said first visor between said first and second positions thereof said first visor is caused to move to a higher position approximately mid-way in its travel so as to pass above the head of an occupant of the vehicle.

5. The sun visor arrangement as recited in claim 1, wherein:
   (a) said first visor includes a horizontally extending rod about which said first visor is movable between a horizontal position and a vertical position;
   (b) said horizontally extending rod having a section at one end thereof extending at an angle of approximately 45° with the remainder of said rod; and
   (c) means for mounting said section in a position with the axis thereof in a plane approximately mid-way between the plane of the windshield and the plane of the door, whereby during movement of the first visor between said first and second positions thereof, said first visor is caused to move to a higher position approximately mid-way in its travel so as to pass above the head of an occupant of the vehicle.

6. The sun visor arrangement as recited in claim 1, wherein:

(a) said second visor is positioned generally in the center of the windshield;
(b) a third visor is positioned adjacent to said second visor on the side opposite said first visor and substantially at the end of the windshield opposite that occupied by said first visor; and
(c) said third visor being pivotally mounted for movement of between a first position adjacent the windshield and a second position adjacent the other of said doors.

* * * * *